April 1, 1958     L. M. CRAIG ET AL     2,828,980
AXIAL AND RADIAL STRESS RELIEVING CONDUIT COUPLING
Filed June 14, 1954
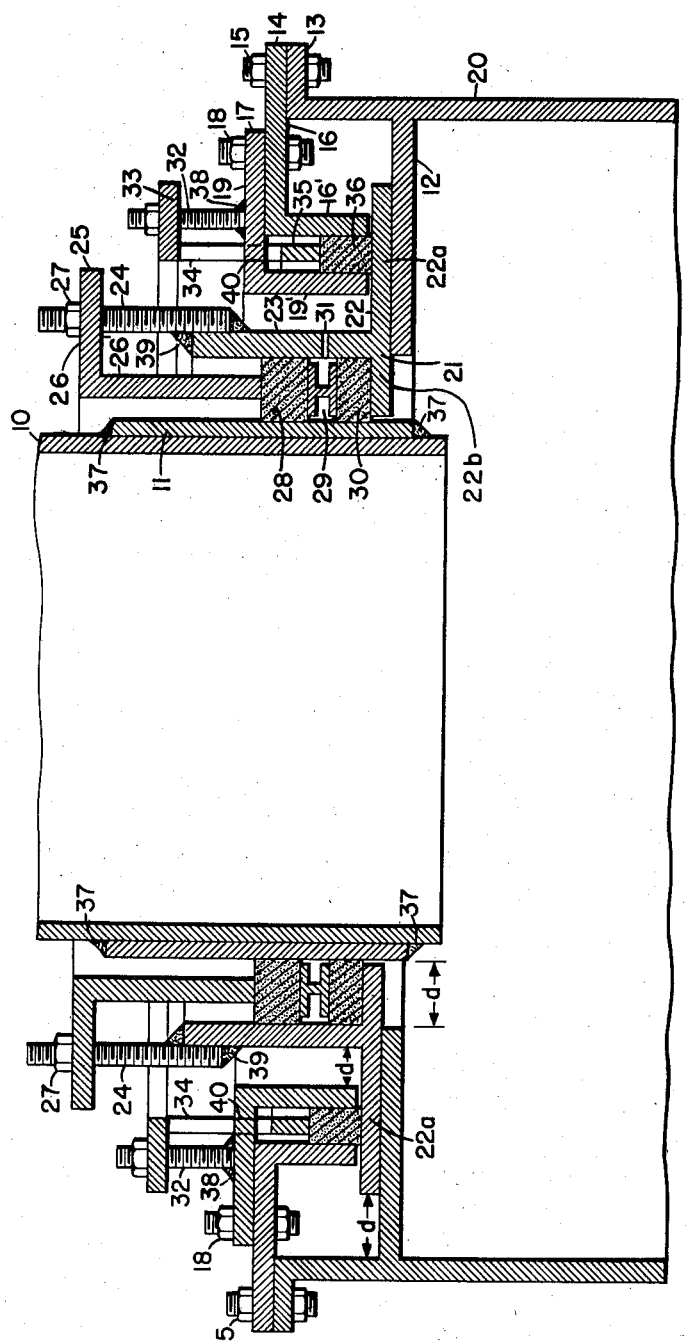
Lester M. Craig
David D. Wilson     Inventors
By   Edwin M. Thomas Attorney

United States Patent Office 2,828,980
Patented Apr. 1, 1958

2,828,980

AXIAL AND RADIAL STRESS RELIEVING CONDUIT COUPLING

Lester M. Craig and David D. Wilson, Baton Rouge, La., assignors to Esso Research and Engineering Company, a corporation of Delaware Application June 14, 1954, Serial No. 436,672

3 Claims. (Cl. 285—163)

This invention relates to apparatus adapted to join two conduit members and more particularly relates to to apparatus adapted to seal together two conduit members in fluid communication while permitting axial as well as radial movement of one of the conduit members in relation to the other.

Under certain circumstances when it is necessary to connect a conduit member between two vessels or other bodies, an expansion coupling, or similar connection, will be employed in the conduit. Such a coupling permits limited shifting of the connected vessels without causing a rupturing or fracturing of the connecting conduit. This shifting of the connecting vessels may be due to a variety of causes such as thermal expansion or contraction, vibration, settling of supporting structures due to ground conditions or external forces, etc. In any event when this shifting occurs an axial and/or radial strain may be exerted upon the connecting conduit and the resultant stress may cause the conduit to break unless provision is made to permit a compensating shifting within the conduit as by the use of an expansion coupling.

In the case where the connecting conduit contains or transports a fluid or fluidized finely divided solid, this problem is further complicated by the requirement that the expansion coupling employed must be fluid tight so as to prevent the escape of the fluid or fluidized solid in addition to permitting axial and/or radial movement of one portion of the conduit in relation to the other portion. Also in such a case there may be a still further complication as the fluid or fluidized solid contained or transported in the conduit may erode or corrode the working parts of the coupling. Thus, it is evident that rather extreme requirements are placed on an expansion coupling employed in this latter type of service. Previous expansion couplings have not been entirely successful in this type of service. The present invention is designed to overcome the shortcomings of the prior art devices.

An object of this invention is to provide apparatus for joining two conduit members which permits axial as well as radial movement of one conduit member in relation to the other.

A further object of this invention is to provide apparatus for sealing together two conduit members in fluid communication while permitting axial as well as radial movement of one of the conduit members in relation to the other.

A still further object of this invention is to provide apparatus for sealing together two conduit members in fluid communication while permitting axial as well as radial movement of one of the conduit members in relation to the other and in which apparatus the working parts are substantially external to the conduit members, thereby reducing erosion and/or corrosion from fluids or fluidized finely divided solids flowing therethrough.

Still other objects of this invention will be apparent from a reading of the specification which will best be understood when read in conjunction with the single figure drawing which shows the present invention in cross-section to facilitate the disclosure.

Briefly the apparatus of this invention includes two conduit members aligned substantially axially of each other. The end of one of the conduit members overlaps the adjacent end of the other in spaced telescopic relation thereto. Extending radially inward from the overlapping end portion of the outer conduit member are a pair of annular members which are in radial spaced relation to the overlapped end portion of the inner conduit and in axial spaced relation one to the other. An annular sealing member provided with a radially extending continuous flanged portion and an axially extending continuous band portion is spaced between the adjacent end portions of the two conduit members such that the continuous flanged portion is radially movable in fluid-tight relation between the two annular flange members and the continuous band portion is axially movable in fluid-tight relation with the end portion of the inner conduit member. The apparatus of this invention thereby permits limited radial movement as well as axial or longitudinal movement of the conduits one to the other. In addition, the apparatus of this invention permits rotation of both conduit members about their longitudinal axes when the conduits have a circular cross section.

It is to be understood that the two conduit members of this invention could be considered as a single continuous conduit containing an expansion coupling. Also, while the apparatus of this invention is shown in the drawing and described specifically as including circular conduits and flange members, it is to be clearly understood that this invention is equally applicable to conduits having any cross-sectional shape such as rectangular, hexagonal, octagonal, etc. so that it will be further understood that the words annular, radial, and axial apply to these types of conduits as well.

Referring now to the drawing, reference character 10 designates a conduit member which is sealed in fluid communication with conduit member 20 in accordance with this invention. It is to be understood that conduit members 10 and 20 may be constructed of any material, such as metal, plastic, etc., which is suitable for the service for which the conduit members are utilized. Normally, the distant ends of conduit members 10 and 20 will be rigidly secured to separate structures, vessels or bodies (not shown). The distant ends of conduit members 10 and 20 are shown broken off to illustrate that they may be of any length. Although conduit member 20 is shown as having a greater diameter than conduit member 10, it is to be understood that the main portion of conduit member 20 may be of the same diameter as, or in fact even smaller in diameter than, conduit member 10 in which case conduit member 20 would be enlarged only at its end adjacent to conduit member 10. In any event the adjacent end portion of conduit member 20 overlaps the adjacent end portion of conduit member 10 in spaced telescopic relation thereto. Conduit members 10 and 20 are substantially axially aligned with each other and their adjacent end portions are in parallel-spaced relation to each other. Arranged about and rigidly joined by any conventional means such as welds 37 to the adjacent end portion of conduit member 10 is wear plate 11 which, although not essential to the present invention, is desirable to prevent wear of conduit member 10 which may occur in the event of frequent axial movement of one conduit member in relation to the other. Wear plate 11 extends from the end of conduit member 10 a distance at least equivalent to the amount of axial movement anticipated during the utilization of this invention.

Extending radially inward from conduit member 20 is annular flange member 12 which is arranged within the overlapping end portion of conduit member 20 and which is either integral therewith as shown in the drawing or is rigidly secured thereto by any conventional means. Annular flange member 12 is radially spaced from the end portion of conduit member 10 and wear plate 11 and is axially spaced from the overlapping end of conduit member 20. The amount of radial spacing "d" between the inner edge of annular flange member 12 and wear plate 11 is selected to be equivalent to at least the greatest radial movement normally anticipated between conduit members 10 and 20. Normally conduit members 10 and 20 will be initially aligned so that the amount of radial displacement possible in any radial direction from this position is equal to "d." However, of course, the maximum radial displacement is equal to 2 "d" when measuring the displacement from one extreme to the other.

The overlapping end of conduit member 20 is provided with a flange 13 which extends outward radially from conduit member 20 and which may be integral with conduit member 20 as shown in the drawing. Mounted on flange 13 is annular member 14 which is substantially L-shaped in cross section and which includes radially extending flange 16 and axially extending ring 16'. Flange 13 is rigidly connected to the outer part of radially extending flange 16 of annular member 14 by bolting means 15 so that the apparatus of the present invention may be readily assembled and disassembled. Radially extending flange 16 is axially spaced from annular flange 12 and extends radially inward from flange 13 to a point above about the middle of the surface of annular flange 12. At its inner end radially extending flange 16 is joined to axially extending ring 16' which extends therefrom axially toward annular flange member 12 in spaced relation thereto.

Mounted on annular member 14 is annular member 17 which is also substantially L-shaped in cross section and which includes radially extending flange 19 and axially extending ring 19'. Radially extending flange 19 of annular member 17 is rigidly secured to radially extending flange 16 of annular member 14 by bolting means 18 so that the apparatus of the present invention may be readily assembled and disassembled. Radially extending flange 19 extends radially inward from about the middle of radially extending flange 16 to a point beyond axially extending ring 16' which is above about the middle of the surface of annular flange 12. At its inner end radially extending flange 19 is joined to axially extending ring 19' which extends therefrom axially toward annular flange member 12 in spaced relation thereto. Axially extending ring 19' is radially spaced in telescopic association from axially extending ring 16' and both are equally axially spaced from annular flange 12.

Because annular members 14 and 17 are rigidly attached to each other, they effectively act as a single annular member extending radially inward from the overlapping end of conduit member 20 toward conduit member 10 in spaced relation thereto. In fact, if desired, annular members 14 and 17 may be consturcted as a single integral member. In this case then, this single annular member can be considered as being provided at its inner portion with a continuous ring which extends in the direction of annular flange 12 in spaced relation thereto and which is provided with a continuous groove having its opening facing annular flange 12.

Annular sealing member 21 which is somewhat T-shaped in cross section is arranged between the end portions of conduit members 10 and 20 and includes a radially extending flange 22 and an axially extending band or ring 23. Radially extending flange 22 is radially spaced between the end portions of conduit members 10 and 20 with its outer portion 22–a arranged axially between annular flange member 12 and the adjacent surfaces of axially extending rings 16' and 19' so that outer portions 22–a is radially movable or slideable therebetween. The outer edge of radially extending flange 22 is radially spaced from conduit member 20 by at least a distance equal to "d." At its inner edge, radially extending flange 22 is spaced in close proximity to wear plate 11. Radially extending flange 22 is joined near its inner edge to axially extending 23 which extends axially therefrom in a direction away from conduit member 20. Axially extending ring 23 is radially spaced at its outer edge a distance equal to at least "d" from axially extending ring 19' to permit radial movement of one conduit member in relation to the other for at least that distance. Also axially extending ring 23 is radially spaced at its inner edge from wear plate 11 to thereby provide a space for packing which will be hereinafter described in greater detail.

Rigidly connected to axially extending ring 23 by any conventional means, such as welds 39, are at least two bolts 24 which extend axially therefrom in a direction away from conduit member 20. Annular member 25 which is radially spaced substantially concentrically about conduit member 10 and which includes radially extending flange 26 and axially extending ring 26' is arranged to have bolts 24 pass through radially extending flange 26. Annular member 25 is substantially L-shaped in cross section. Radially extending flange 26 extends radially inward from bolts 24 to a point intermediate wear plate 11 and axially extending ring 23 of annular sealing member 21 at which point radially extending flange 26 is joined to axially extending ring 26' which extends axially therefrom in the direction of inner portion 22–b of radially extending flange 22 in spaced relation thereto. Axially extending ring 26' is radially spaced between wear plate 11 and axially extending ring 23 of annular sealing member 21. Bolts 24 are provided with nuts 27 which may be tightened to thereby depress axially extending ring 26' of annular member 25 against packing 28 which is radially arranged between wear plate 11 and axially extending ring 23 of annular sealing member 21. Lantern ring 29 which is spaced about wear plate 11 is positioned between packing 28 and packing 30. Packing 30 bears axially on its other side against inner portion 22–b of radially extending flange 22 of annular sealing member 21. Radially extending ring 23 is provided with at least one inlet 31 which provides a means for introducing a lubricating grease into the space around lantern ring 29 between packing 28 and 30. Thus by tightening bolts 27, packing 28 and 30 are compressed axially between axially extending ring 26' and inner portion 22–b of radially extending flange 22 to cause packing 28 and 30 to expand radially and bear against wear plate 11 and axially extending ring 23 to thereby effect a fluid-tight seal between conduit member 10 and annular sealing member 21 while still permitting axial movement of conduit 10 in relation to annular sealing member 21.

Rigidly mounted on annular member 17 and rigidly secured thereto by any conventional means such as welds 38 are bolts 32 which extend axially therefrom in a direction away from conduit member 20. Annular flange 33 which is radially spaced substantially concentrically about conduit member 10 is arranged with bolts 32 passing therethrough. Extending axially from annular flange 33 in the direction of conduit member 20 are at least two connecting rods 34 which pass through holes 40 in radially extending flange 19 and which connect at their other end to ring 35 which contacts packing 36 arranged radially between axially extending rings 16' and 19'. Thus by tightening bolts 32, annular flange 33 is depressed which as a result depresses ring 35 through connecting rods 34 to thereby compress packing 36. Packing 36 which bears against radially extending flange 22 of annular sealing member 21 forces radially extending flange 22 against annular flange 12. Radially extending flange 22 of annular sealing member 21 is thus radially movable between and in fluid-tight relation with annular flange 12 and axially extending rings 16' and 19'.

It will readily be seen from the figure and the preceding description that the novel apparatus of this invention provides for axial and/or radial movement of one of the conduit members in relation to the other. Basically there are three structurally independent parts, namely conduit member 10, annular sealing member 21, and conduit member 20 including annular flange member 12 and annular members 14 and 17 which are all rigidly attached to conduit member 20. Thus in the case of radial displacement, conduit member 10 and sealing member 21 act as one with the radially extending flange 22 of annular sealing member 21 moving radially between annular flange 12 and radially extending rings 16' and 19' which are effectively attached to conduit member 20. In the case of axial displacement, annular sealing member 21 and conduit member 20, together with its associated parts, act as one with axially extending ring 23 of annular sealing member 21 moving axially along wear plate 11 of conduit member 10. It will also be seen that either conduit member may rotate about its longitudinal axis providing the conduit members are substantially circular in cross section. Packings 28, 30 and 36 provide the necessary sealing means to effect a fluid-tight seal. It is preferable, of course, to employ packing material which is not subject to deterioration in the presence of the fluid carried by conduit members 10 and 20. It will be further noted that the working parts of the novel apparatus of this invention are not exposed to any fluids or fluidized solids which may be passing through conduits 10 and 20 and that all necessary adjustments, such as tightening the packing to effect a better seal, may be readily made without disassembling the apparatus of this invention.

It is to be understood that this invention may be employed solely as a means for joining tubular members of any shape when it is desired to provide for axial and/or radial movement of the tubular members. In other words, this invention is applicable to situations where it is not essential that there be a fluid-tight seal between the coupled members. It is also to be understood that the concept of this invention may be applied with advantage to join in fluid-tight relation two tubular or enclosing members wherein there is contained a fluid or fluidized solid under reduced, atmospheric, or elevated pressure. However, the present invention is particularly advantageous for sealing two conduit members in fluid communication while still permitting axial and/or radial displacement of one of the conduit members in relation to the other and wherein it is essential that the working parts of the sealing means be unexposed to the fluid or fluidized solid being transported in the conduits for reasons of corrosion or erosion. More specifically, the apparatus of the present invention is especially adapted for use in conduits employed in fluid catalytic cracking processes, fluid hydroforming processes, fluid coking processes, etc., wherein finely divided solids are employed as a catalyst and/or a heat transfer medium, although it will be understood that the invention is not limited thereto.

What is claimed is:

1. A fluid-tight conduit assembly, comprising first and second conduit sections each having an open end portion, said sections adapted for association with the open end portion of said second section telescopically disposed within the open end portion of said first section open end and in radially spaced relation thereto, an annular flange plate joined at its outer periphery to the inner wall of said first section in axially spaced relation to the open end thereof, said flange plate having a bearing surface portion facing outwardly toward said open end and an inner peripheral edge in radially spaced relation to said second conduit end portion, an annular seal plate having an obverse seal surface portion, a reverse sliding contact surface portion, an inner peripheral edge adapted for slidably fitted contact with said second conduit end portion, and an outer peripheral edge disposed in the open end of said first conduit with said seal plate reverse surface portion in surface contact with said flange bearing surface portion and said seal plate outer peripheral edge in radially spaced relation to the inner wall of said first conduit, annular flange means mounted on said first conduit section end extending radially inward therefrom into overlapping axially spaced relation to the outer peripheral edge of said seal plate but terminating at its inner periphery in radially spaced relation to said second conduit end portion, said flange means defining a first annular recess opening inwardly of said first conduit toward said seal plate obverse surface, a seal ring joined to said seal plate obverse surface at right angles thereto intermediate said second conduit and said annular flange means, said ring, seal plate, and second conduit defining a second annular recess opening outwardly from said seal plate, a first annular packing seal disposed in said first recess, a second annular packing seal disposed in said second recess, and separate pressure means supported on each of said annular flange means and said seal ring each engageable with one of said first and second packing seals respectively to force said seals into fluid tight relation with said seal ring obverse surface portion and the defining walls of said recess.

2. A conduit assembly according to claim 1, wherein said pressure means supported on said seal ring comprises a plurality of stud bolts secured to said ring in circumferentially spaced relation extending beyond said seal ring, a pressure ring adapted to be received in said second annular recess substantially concentric with said pressure plate and seal ring, said pressure ring having an inner end edge engageable with said second annular packing seal and an outer end edge, a flange on said outer end edge extending radially outward therefrom for engagement over said seal ring bolts, and means including nuts threadable on said bolts against said flange, whereby to press said pressure ring against said second packing seal.

3. A conduit assembly according to claim 1, wherein said pressure means supported on said annular flange means comprises a series of stud bolts secured to said flange means in spaced relation circumferentially of the surface thereof to extend axially therefrom, a compression ring interiorly of said flange means recess in contact with said second packing seal therein, an annular compression plate adapted for engagement over and freely to receive said stud bolts, said plate having obverse surface and reverse surface portions of which the latter faces said flange means, at least two rod elements adapted to be extended through receiver openings in said flange means into pressure contact with said compression ring, and means including nuts threadable on said stud bolts against said compression plate obverse surface portion, whereby to press said compression ring against said first packing seal.

References Cited in the file of this patent
UNITED STATES PATENTS

| | | |
|---|---|---|
| 184,349 | Decrow | Nov. 14, 1876 |
| 1,349,663 | Cumfer | Aug. 17, 1920 |
| 1,802,353 | Rousek et al. | Apr. 28, 1931 |
| 2,364,133 | Roza | Dec. 5, 1944 |
| 2,511,813 | Lockwood | June 13, 1950 |
| 2,517,470 | Erisman | Aug. 1, 1950 |
| 2,628,851 | Jessup | Feb. 17, 1953 |
| 2,646,294 | Anderson | July 21, 1953 |
| 2,656,201 | Swerdlow et al. | Oct. 20, 1953 |
| 2,688,501 | MacLeod | Sept. 7, 1954 |